March 19, 1968
R. G. FRIESS
3,374,391
SWEEP PROTECTION CIRCUIT
Filed March 3, 1966
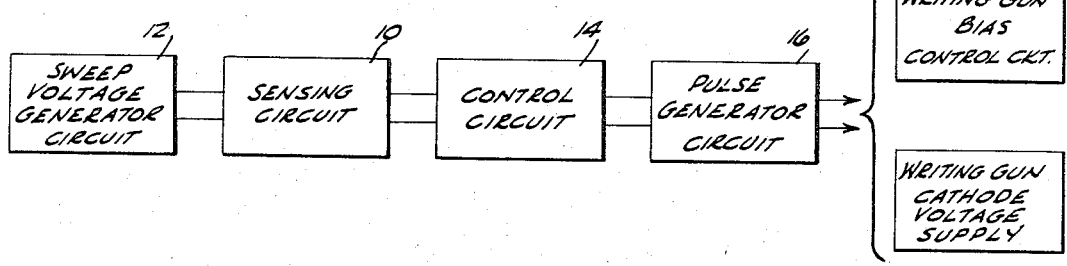
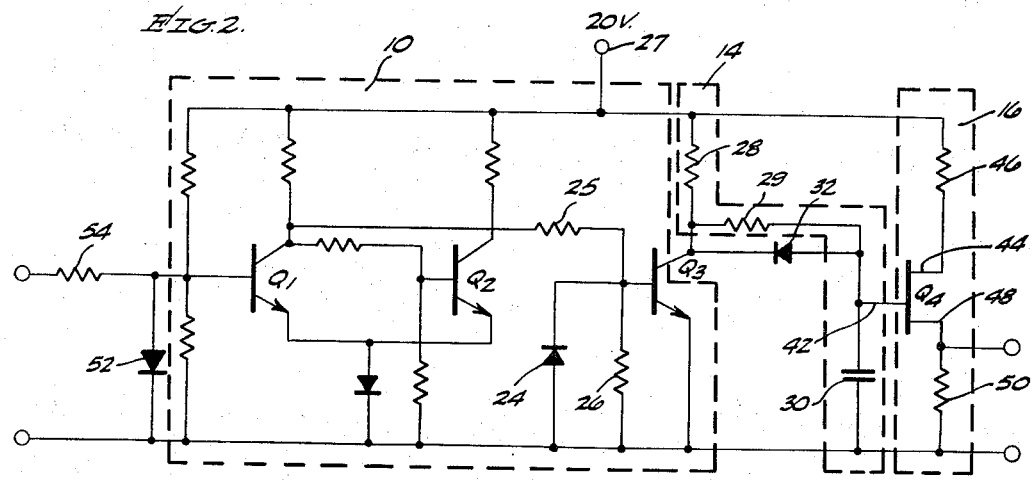
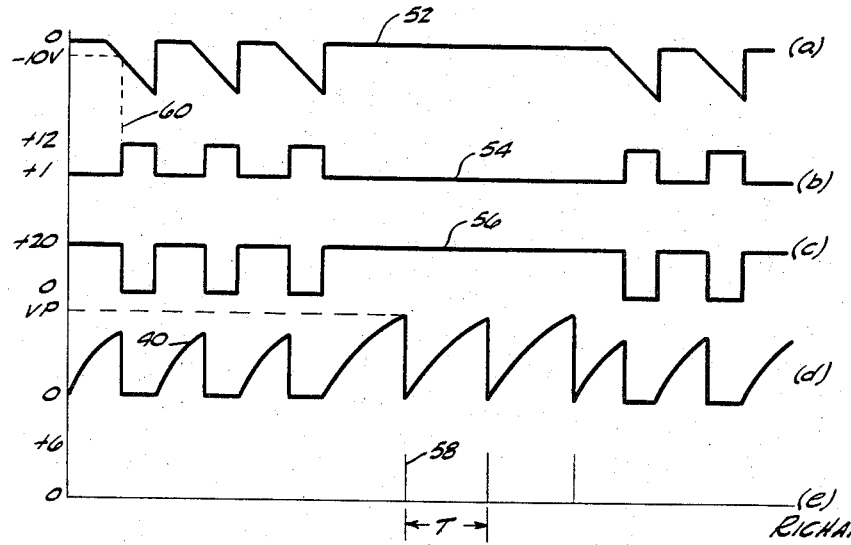
INVENTOR.
RICHARD G. FRIESS,
BY
Walter R. Thiel
ATTORNEY.

United States Patent Office 3,374,391
Patented Mar. 19, 1968

3,374,391
SWEEP PROTECTION CIRCUIT
Richard G. Friess, San Marcos, Calif., assignor to Hughes Aircraft Company, Culver City, Calif., a corporation of Delaware
Filed Mar. 3, 1966, Ser. No. 531,432
4 Claims. (Cl. 315—20)

This invention relates to electron beam tubes such as a cathode ray tube or a direct view storage tube, and in particular to an improved protection circuit for preventing damage to the sensitive luminescent screen of the tube upon loss of the sweep voltage driving the beam deflection systems of the tube.

Sweep protection circuits are commonly employed in electron beam tubes to prevent damage to the sensitive writing surface of television kinescopes or oscilloscopes such as that resulting from the loss of the voltage driving the beam horizontal and vertical beam deflection systems of the tube. The failure of either such sweep signals causes the electron scanning beam to be deflected along one axis only, thus producing a single line on the luminescent screen. If the beam current is sufficiently large and if a sufficiently high accelerating voltage is applied to the anode of the tube, this line may cause a burning of the screen material which produces a blemish on the tube face.

Therefore, one object of the present invention is to provide an improved circuit for automatically and rapidly protecting the screen of an electron beam tube when there is an undesired change in the sweep voltage.

A further object of the present invention is to provide an improved protection circuit for electron beam tubes which disables the writing gun when a loss or undesired change in sweep voltage is detected to prevent blemishes on the highly sensitive tube screen.

Another object of the present invention is to provide an improved protection circuit for electron beam tubes which upon detection of a loss of sweep voltage or a decrease in the repetition rate of the sweep voltage below a predetermined value develops an output pulse which may be used to disable the writing gun.

In general, in its preferred form, the present invention comprises a sensing circuit coupled to the sweep voltage generator circuit of an electron beam tube which detects the loss of the sweep voltage developed by the generator circuit or any decrease in the repetition rate of the sweep voltage below a preselected frequency. The sensing circuit is coupled to a control circuit which triggers a pulse generator circuit to develop an output pulse for disabling the writing gun of the electron beam tube.

Other advantages of the invention will hereinafter become more fully apparent from the following detailed description of a preferred embodiment of the invention when considered in conjunction with the accompanying drawings in which:

FIG. 1 is a block diagram illustrating the primary circuit components of a sweep protection circuit according to the principles of the present invention;

FIG. 2 is a schematic circuit diagram showing a preferred embodiment of the circuit of FIG. 1; and FIG. 3(a)–(e) illustrate voltage and current waveforms of various points in the circuit of FIG. 2.

Referring now to FIG. 1, a preferred embodiment of the sweep protection circuit of the present invention comprises a sensing circuit 10 which is connected to the sweep voltage generator circuit 12 of an electron beam tube, such coupling may be made to the output terminal of the generator 12 or, if desired, directly to one deflection element of the tube. The sensing circuit 10 is connected to a DC reference voltage, illustrated as ground, to which the sweep generator circuit 12 is also connected. A control circuit 14 is coupled between the sensing circuit 10 and a pulse generator circuit 16 to control the actuation of the pulse generator circuit for developing an output pulse only under preselected conditions. Thus, the sensing circuit is in a position to rapidly detect undesired changes in sweep voltage, which for most applications as discussed above are the loss of the sweep voltage completely or a decrease in the repetition rate of the sweep voltage below a preselected frequency. This output pulse may be used in several different ways to disable the writing gun of the electron beam tube. Shown for illustration only are two methods; firstly, coupling it to the grid electrode of the writing gun to change the bias potential or, secondly, coupling it to the voltage supply circuit for the cathode electrode of the writing gun to change the operating potential.

The specific circuitry comprising the sensing circuit 10, control circuit 14 and pulse generator circuit 16 blocks of FIG. 1 in accordance with a preferred embodiment is illustrated in FIG. 2. As is shown, the sensing circuit 10 comprises a Schmitt trigger circuit including a pair of NPN transistors Q1 and Q2 and a plurality of resistors coupled in a conventional manner. For a more detailed description of a conventional Schmitt trigger, reference may be made to p. 21 of the text "Transistor Circuit Design," Texas Instrument Corporation, published by McGraw-Hill Book Company, Inc., 1963. The sensing circuit 10 also includes a transistor switch circuit comprising a conventional transistor Q3 of the NPN type and a diode 24 and a pair of resistors 25, 26 for coupling it to the output of the Schmitt trigger circuit at the collector electrode of transistor Q1.

The sensing circuit 10 is protected from large sweep voltages by a zener diode 52 and a resistor 54 of such value to limit the voltage at the base electrode of transistor Q1 to a safe value.

The control circuit comprises resistors 28 and 29 and a capacitor 30 with the resistor 28 coupled between a DC reference 27 such as 20 v. DC and the collector electrode of transistor Q3 and the other resistor 29 and the capacitor 30 coupled between the collector electrode and ground. A diode 32 is in series between the collector electrode of transistor Q3 and one terminal of the capacitor 30, with the anode coupled to the capacitor 30 and the cathode to the collector electrode. As long as the transistor Q3 is in a nonconductive state the diode 32 is back biased and remains so until the transistor Q3 is rendered conductive. During this time the capacitor is charged through resistors 28 and 29 to a potential such as shown by the waveform 40 of FIG. 3(d). However, when the transistor Q3 conducts this couples the capacitor 30 to ground via the diode 32 and the emitter collector path of the transistor Q3.

The pulse generator circuit comprises a conventional unijunction transistor Q4 having an emitter electrode 42 coupled to the control circuit 14 at a point intermediate the resistor 29 and the capacitor 30 and having a first base 44 connected via a resistor 46 to the reference 27 and a second base 48 connected via a resistor 50 to ground.

It is pointed out, however, that the magnitude and polarity of the voltages shown in FIG. 2 are purely illustrative and in practice will depend upon the particular transistors and other circuit components used. For example, transistors of complementary conductivity types from those shown in the circuit of FIG. 2 are equally suitable and when such transistors are employed the polarity of the voltages applied to the bias and power supply terminals will be opposite from those shown.

Exemplary voltage and current waveforms along with typical magnitudes which occur at various points in the control circuit portion of the circuit of FIG. 1 are shown in FIGS. 3 (a)–(e). More specifically, the output voltage of the sweep voltage generator circuit is indicated by the waveform 52 of FIG. 3(a); the collector-emitter voltage of the transistor Q1 is indicated by waveform 54 of FIG. 3(b); the collector-emitter voltage of the transistor Q3 is indicated by waveform 56 of FIG. 3(c); the voltage at the emitter of the transistor Q4 is indicated by waveform 40 of FIG. 3(d); and the output voltage pulse of the pulse generator circuit is indicated by waveform 58 of FIG. 3(e). As seen in FIG. 3(a) and 3(b) with zero volts at the input to the sensing circuit, transistor Q1 is in a conductive state. This produces a low voltage at the collector electrode which also appears at the base electrode of transistor Q3 putting it in a nonconductive state. With transistor Q3 nonconductive, this allows the capacitor 30 to charge through resistors 28 and 29 and when the voltage across the capacitor 30 reaches $V_p$ (the peak emitter voltage of the unijunction transistor Q4) the emitter 42 to first base 44 resistance of the transistor Q4 becomes negative triggering it and causing the capacitor 30 to discharge rapidly to ground via the emitter base 48 path of the transistor Q4 and the resistor 50. This causes a large pulse of current to flow in the emitter-base path of transistor Q4 producing a positive voltage spike across resistor 50 and thus across the output terminals. When capacitor 30 is discharged, the emitter 42—first base 44 resistance of transistor Q4 is no longer negative, thus rendering it nonconductive. This means that the capacitor 30 can again charge through resistors 28 and 29 and if no output pulse from the sensing circuit arrives at the base of Q3, the capacitor 30 again charges to the $V_p$ potential and the transistor Q4 again produces a positive output pulse.

When a negative going sweep is present at the input, transistor Q1 stops conducting. This produces a positive pulse at the base of transistor Q3 placing it in a conductive state and allowing capacitor 30 to discharge through diode 32 and the cathode to anode path of transistor Q3. Each such subsequent pulse renders transistor Q3 conductive and if the repetition period of these pulses is less than the time constant of the control circuit the voltage across capacitor 30 does not reach the triggering voltage $V_p$ of transistor Q4. However, if the sweep voltage becomes zero or is of a repetition period greater than the time constant of the control circuit, Q1 becomes conductive switching transistor Q3 off and allowing the voltage across capacitor 30 to charge up to the triggering voltage $V_p$ of transistor Q4, thus triggering it and developing an output pulse.

In the preferred embodiment it was found desirable to detect not only conditions of zero sweep voltage and decreases in repetition frequency but also sweep voltages of less than —10 volts, since such deflection voltages produce such small sweeps of the electron beam that tube damage may result. Thus, as is shown by a dashed line 60 in FIG. 3 the switching transistor Q3 does not conduct until the sweep voltage has reached magnitude and polarity of —10 volts. In this regard, if desired, it should be understood that different circuit components may be used to vary the voltage magnitude at which the transistor Q3 is switched.

It is necessary for a sweep to start and for the transistor Q3 to be in the nonconductive state or off state before the capacitor 30 charges to the $V_p$ level. Therefore, the R.C. time constant of the control circuit must be adjusted for varying speed repetition rates and sweep times. For example, if it is assumed that T represents the time constant of the control circuit and is equal to one millisecond, then one millisecond after the end of a sweep an output pulse will be generated. The only way to prevent the development of this pulse is to have a new sweep start less than one millisecond after the end of the preceding sweep. Thus, the time limitation of the circuit is not the sweep speed but rather the off time of the sweep.

As mentioned above, one method of using the output pulse of the transistor Q4 to control the writing gun of the electron beam tube utilizes a conventional flip flop circuit floating at the same potential as the tube cathode and capacitively coupled to the output of transistor Q4 so that when a pulse appears at this output it is coupled to the cathode to change the bias voltage between the cathode and grid of the electron beam tube sufficiently to disable the tube. A second method of utilizing the output pulse from the transistor Q4 is to utilize a silicon-controlled rectifier to actuate a relay. The contacts of the relay can either control the AC supply voltage to the cathode or switch the bias voltage at the tube grid.

While the basic principle of this invention has been herein illustrated along with one embodiment it will be appreciated by those skilled in the art that variations in the disclosed arrangement both as to its details and as to the organization of such details may be made without departing from the spirit and scope thereof. Accordingly, it is intended that the foregoing disclosure and the showings made in the drawings will be considered only as illustrative of the principles of the invention and not construed in a limiting sense.

What is claimed is:

1. In combination with an electron beam tube including a writing beam circuit and a sweep voltage generating circuit means having an output voltage of a preselected waveform, a protection circuit comprising:

a sensing circuit means connected to said sweep voltage generating circuit means for developing one output signal when the output voltage of said sweep voltage generating circuit means is of said preselected waveform and a second output signal when said output voltage is of a waveform other than said preselected waveform;

a pulse generating circuit means coupled to said writing beam circuit for disabling said writing beam circuit when said pulse generating circuit means develops an output pulse; and a control circuit means coupled between said sensing circuit and said pulse generating means for causing said pulse generating means to develop an output pulse when said sensing circuit develops said second output signal.

2. The protection circuit of claim 1 wherein the sensing circuit includes an electronic switch adapted to be in a closed condition when the output voltage of said sweep voltage generating circuit means is of said preselected waveform and in an open condition when said output voltage is of a waveform other than said preselected waveform and the control circuit includes a capacitor adapted to be discharged through said electronic switch when it is in said closed condition and through said pulse generating circuit when it is in said open condition.

3. The protection circuit of claim 2 wherein the sensing circuit means also includes a Schmitt trigger circuit and the pulse generatng circuit means includes a unijunction transistor.

4. The protecton circuit of claim 1 wherein the control circuit means is an integrating circuit having an R.C. time constant greater than the repetition period of the waveform of the output voltage of the sweep voltage generating circuit means.

No references cited.

RODNEY D. BENNETT, *Primary Examiner.*

T. H. TUBBESING, *Assistant Examiner.*